Oct. 11, 1938.  T. A. RICH  2,133,150

FREQUENCY METER

Filed Sept. 29, 1937

Inventor:
Theodore A. Rich,
by Harry E. Dunham
His Attorney.

Patented Oct. 11, 1938

2,133,150

UNITED STATES PATENT OFFICE 2,133,150

FREQUENCY METER

Theodore A. Rich, Schenectady, N. Y., assignor to General Electric Company, a corporation of New York Application September 29, 1937, Serial No. 166,363

5 Claims. (Cl. 172—245)

My invention relates to frequency meters, and its object is to provide an inexpensive, yet accurate and reliable meter for the indication of frequency suitable for the vast majority of cases where the frequency to be measured and indicated varies only slightly from some standard value. In carrying my invention into effect, I make use of a differential measuring instrument energized from a pair of tuned circuits, the circuits being tuned to frequencies slightly above and slightly below the standard value of the frequency of the circuit metered, and the instrument having its zero torque point at mid-scale, which point corresponds to such standard value of frequency. By such an arrangement the error in measurement due to voltage variations becomes zero at the most important point on the instrument scale, and by using an instrument and indicating scale designed to indicate only a range of frequency variation close to the standard value, the voltage error is negligible in any case and may be disregarded and hence the instrument requires no voltage error compensation.

Figure 1:
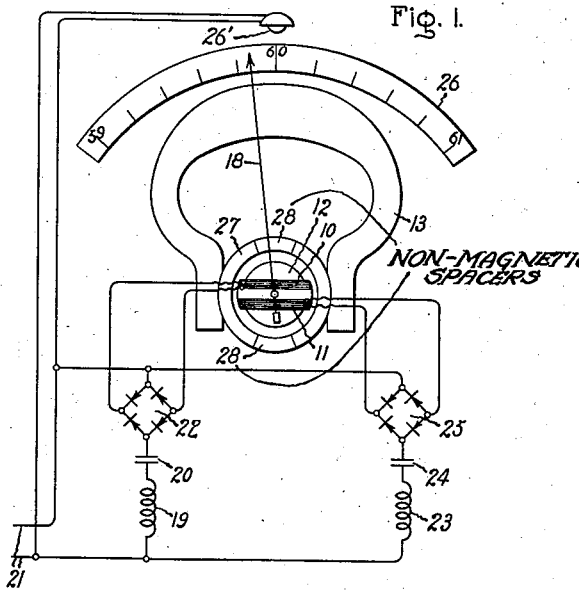
Figure 2:
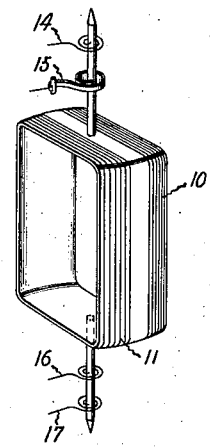
Figure 3:
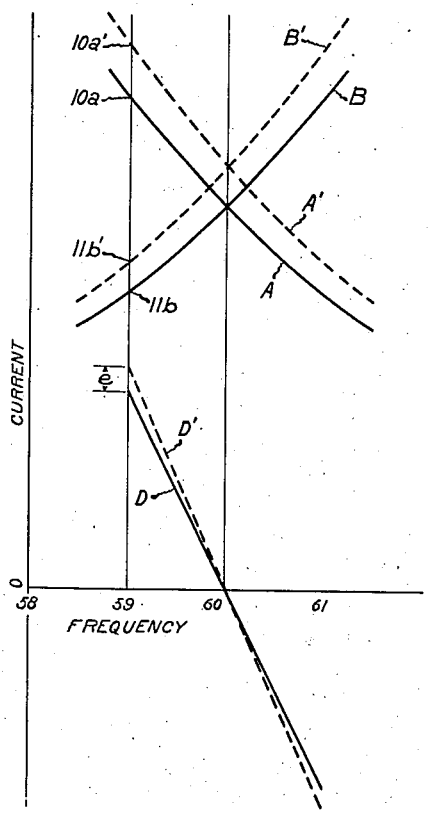
Figure 4:
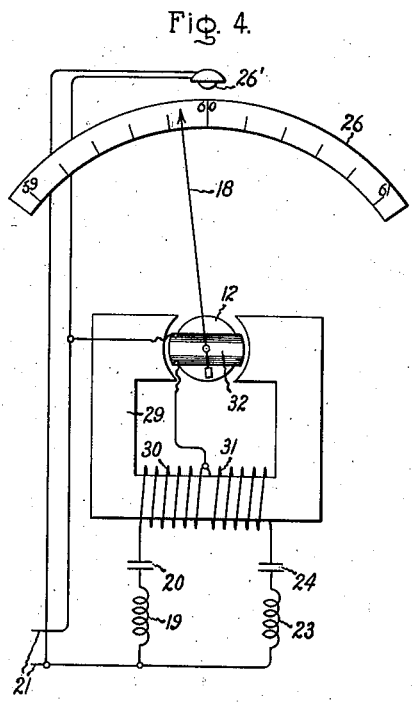

The features of my invention which are believed to be novel and patentable will be pointed out in the claims appended hereto. For a better understanding of my invention reference is made in the following description to the accompanying drawing in which Fig. 1 represents a direct current differential instrument energized through full wave rectifiers from tuned circuits. Fig. 2 is a perspective side view of the armature of Fig. 1 showing the flexible current connections thereto and its control spring. Fig. 3 shows curves of the tuning relationship of the measurement circuits, and Fig. 4 is an alternating current differential frequency meter embodying my invention.

Referring to Figs. 1 and 2, I have here shown a direct current measuring instrument similar in mechanical construction to a direct current ammeter except the moving coil system consists of two coils, 10 and 11. 12 is a stationary iron core and 13 is a stationary permanent magnet. The magnet has curved soft iron pole pieces 27 spaced apart by non-magnetic blocks 28. As indicated in Fig. 2 the moving coil system is provided with four spirals 14, 15, 16 and 17 for connecting the two moving coils to the measuring circuits. Three of these spirals are preferably fine spirals that serve only as conductors and produce no turning moment on the armature in any position. The fourth spiral 15 is made heavier, and in addition to being a current carrying terminal serves as the control spring for the armature. This spring is so adjusted as to return the pointer 18 to a mid-scale position from a deflection to either side when the deflecting force is removed.

Coil 10 of the instrument is energized from a tuned circuit comprising inductance 19 and condenser 20, energized from the terminals 21 connected to the system, the frequency of which is to be indicated. The current flowing in this tuned circuit is, however, rectified by a full-wave rectifier 22 before passing to the instrument coil 10. The other coil 11 of the instrument is likewise energized from source 21 through a tuned circuit, comprising inductance 23, and condenser 24, and a full wave rectifier 25. The direction of direct current flow through the coils 10 and 11 is such that the fluxes, set up by these coils, are in opposition, whereby the resultant flux of the moving coil system has a value depending upon the difference in the currents in the two coils, and a direction depending upon which current is the larger. When the currents are equal the instrument has no torque and its control spring holds the pointer at mid-scale position. When the armature currents are unequal, the differential armature flux reacts with the field of the stationary permanent magnet to produce a deflection away from the mid-scale indication against the action of the control spring, and in a direction dependent upon which armature coil carries the greater current.

It is assumed in the example to be given that the system to be metered is a 60 cycle system. In most cases the system frequency will vary only very slightly from 60 cycles, and the sole function of the frequency meter is to enable the operator to hold as close as possible to the 60 cycle standard. Thus there is no purpose in having the meter under consideration measure frequency except over a very short range above and below 60 cycles, and moreover, if the measurement range is so confined the instrument and its indications can be made more accurate and legible over this small frequency range. In the illustration represented in Fig. 1 the instrument scale 26 is graduated from 59 cycles to 61 cycles with the 60 cycle point at mid-scale.

The tuning of the two measurement circuits for this purpose is represented in the curves of Fig. 3, where the abscissas represent frequency in cycles and the ordinates represent current flow in the coils 10 and 11. The circuit containing inductance 19, condenser 20 and coil 10, is tuned to produce the resonant characteristic shown by curve A with normal voltage at terminals 21. That is, this system is tuned to resonance at about 58.5 cycles and the circuit containing inductance 23, condenser 24, and coil 11 is tuned to give the characteristic of curve B at normal voltage. At 60 cycles the currents in coils 10 and 11 are equal and the instrument has zero torque and indicates 60 cycles. If the frequency decreases below 60 cycles, current in coil 10 increases and current in coil 11 decreases. For instance at 59 cycles the current in coil 10 has the value 10a and current in coil 11 has the value 11b, and hence the instrument torque is proportional to the difference or to the distance from 11b to 10a Fig. 3. This produces a down scale torque and a deflection of the pointer to the corresponding indication of 59 cycles. If the frequency increases above 60 cycles the torque of coil 11 will predominate and the pointer will deflect to the right of mid-scale.

For convenience the difference of the currents in the two coils 10 and 11 at normal voltage for various frequencies is represented by the distance of full line D, Fig. 3, from the zero current line. It is assumed that the instrument is accurately calibrated at normal voltage corresponding to the full line curves A and B.

Now let us examine into the behavior of the instrument when the voltage varies from normal. Let us assume an increase in voltage above normal, amounting to 10 per cent. The currents in the coils 10 and 11 will increase by 10 per cent at any given frequency and will become equal to the values represented by the dotted line curves A' and B' respectively. At 60 cycles the currents in coils 10 and 11, while both different than before, are still equal and hence there will be no voltage error at the most important 60 cycle point of the scale.

At 59 cycles the current in coil 10 has increased 10 per cent to the value 10a' and the current in coil 11 has increased to the value 11b'. It is seen that the current in coil 10 increased more than did the current in coil 11 below 60 cycles. The difference between the currents in the two coils at 110 per cent voltage at the various frequencies is represented by the distance of the dotted line D' from the zero current line.

The resultant torque of the instrument at 59 cycles and normal voltage may be represented by 10a—11b, or the distance D at the 59 cycle point. Thus the difference in torque at 59 cycles at the two voltages is the distance between D and D' or e which represents the torque error at 59 cycles and 110 per cent voltage. e is 10 per cent of the resultant torque at normal voltage. The voltage error of the instrument at 110 per cent volts and 59 cycles is not, however, 10 per cent of 59 cycles, but is something very much less as will be evident from the following. The resultant instrument torque at normal voltage and 59 cycles produces a deflection torque from the zero resultant torque point of 60 cycles equal to 1 cycle deflection, and hence the instrument error, when the resultant torque is increased by 10 per cent, will be 10 per cent of 1 cycle or .10 cycle. The instrument will thus read 59—.10 or 58.90 cycles at 59 cycles and 110 per cent voltage. At 61 cycles and 110 per cent voltage the instrument will read 61.10 cycles. For smaller variations from 60 cycles the voltage error will be still less and becomes zero at 60 cycles as previously mentioned.

It is thus seen that by the arrangement described the instrument error produced by voltage variation is indeed small. Moreover, if, as is usually the case, the instrument is used by an operator to hold 60 cycles and to bring the frequency back to 60, if it departs therefrom, any voltage error at 59 or 61 cycles has no important significance because the instrument does tell the operator that the frequency is too low or too high and when he has brought the frequency back to the 60 point there is no voltage error at all. Such an instrument, therefore, needs no compensation for voltage variations. There is one feature about such an instrument which may be considered to be objectionable and this is, that when the voltage is zero, the instrument reads 60 cycles, or whatever other frequency indication is selected at the midzero torque point of the scale. The operator might thus observe his instrument, when due to a broken lead or blown fuse, it is dead, and consider that the frequency is normal. If objectionable, this feature may be easily remedied by providing a small lamp 26' above the instrument scale connected across the instrument terminals 21. The lamp will thus be lit when there is voltage on the instrument and the lamp will serve for the additional purpose of providing illumination for the instrument scale. Should the lamp go out the operator will know that the instrument should not be depended upon until the condition causing the lamp failure has been corrected. The use of rectifiers permits the use of a highly sensitive low current direct-current instrument but the use of rectifiers in the tuned circuits described does not introduce the usual objection incident to use of rectifiers in instrument circuits. Rectifiers vary in efficiency and resistance with temperature changes, and usually it is necessary to resort to means for compensating for such changes. In the example given, however, the instrument circuits are of high impedance with very little resistance component. What little resistance component is present, due to the rectifiers, is substantially in quadrature relation with the remaining impedance of the circuit, and hence a material variation in such resistance component has a negligible effect upon the impedance of the circuit as a whole, and hence a negligible effect on the instrument current and instrument torque. For this reason compensation for changes in the resistances of the circuits is not required although there may be considerable change in the resistance component of such circuits due to the presence of the rectifiers. This feature of using high impedance rectifier circuits and a direct current frequency measuring instrument and yet avoiding errors due to changes in rectifier resistance will be desirable even in long range frequency meters. The advantages of such an arrangement are in many cases sufficiently great that one can afford to employ a voltage regulator to maintain constant voltage at the terminals of the direct current frequency meter, rather than resort to the use of a voltage compensated alternating current frequency meter.

Fig. 4 shows an alternating current differential instrument having a stationary field magnet 29 energized by the two opposing coils 30 and 31. The circuit of coil 30 is tuned to one frequency by condenser 20 and inductance 19. The circuit of coil 31 is tuned to a different frequency by condenser 24 and inductance 23. The single moving armature coil 32 is connected in series with the two tuned circuits in parallel across the instrument terminals 21. At a frequency lower than 60 cycles the current in coil 30 will predominate and the instrument will deflect to the left of 60 cycles. When the frequency is above 60 cycles, the current in coil 31 will predominate and the instrument deflection will be to the right of 60 cycles. At 60 cycles the instrument will have zero troque and a return spring, such as described in connection with Fig. 2, will return the pointer to a central position. This instrument will have voltage error characteristics similar to the direct current instrument and will have zero voltage error at mid-scale and requires no voltage error compensation.

It will be evident to those skilled in the art that the percentage difference in tuning between the two tuned circuits of the instruments described may be varied, and also the normal frequency point may be varied. For instance, the arrangement may be such as to cause an instrument scale reading from 500 to 600 cycles. This less sensitive instrument will still have zero voltage error at the mid-scale 550 cycle reading but the percentage voltage error in cycles at the ends of the scale will be increased. If for example, 110 per cent voltage produces a 10 per cent increase in resultant torque at 600 cycles, the reading error will be 10 per cent of 50 cycles or 5 cycles and the instrument will read 605, instead of 600 cycles. In other words the voltage error of this type of instrument exists as the percentage error of the deflection from normal frequency and not as the percentage of normal frequency, and the higher the sensitivity of the instrument, the less is the effect of voltage errors on a straight accuracy basis. The instrument used is a differential instrument as distinguished from a ratio instrument.

In accordance with the provisions of the patent statutes, I have described the principle of operation of my invention together with the apparatus which I now consider to represent the best embodiment thereof but I desire to have it understood that the apparatus shown is only illustrative and that the invention may be carried out by other means.

What I claim as new and desire to secure by Letters Patent of the United States, is

1. Frequency measuring apparatus comprising a frequency responsive instrument of the differential type, a frequency calibrated scale therefore, a single stationary field magnet, a movable coil armature and pointer, a spring for returning said movable armature and pointer to a midscale indication corresponding to a given frequency from a deflection in either direction therefrom when the torque of said instrument is zero, two differential energizing circuits for said instrument respectively tuned to different frequencies above and below said given frequency, and such as to produce zero torque on said instrument regardless of the indicating position of its armature when both circuits are energized from a common alternating current source at such given frequency, said apparatus being calibrated at the normal voltage of such source.

2. Frequency measuring apparatus comprising a direct current differential measuring instrument having a scale calibrated in frequency units, a pointer cooperating with said scale, a stationary field magnet, an armature, a spring connected to said armature and biased to produce a midscale indication of said pointer when the torque of said instrument is zero, high impedance, negligible resistance differential energizing circuits for said instrument connected to common alternating current energizing terminals, current rectifying means in both of said circuits, one of said circuits being tuned to resonance at a frequency below that indicated at the low end of the instrument scale and the other circuit being tuned to resonance at a frequency above that indicated at the high end of the instrument scale, said circuits, when energized at the frequency indicated at the center of said scale, producing zero instrument torque, said instrument being otherwise calibrated at the normal voltage thereof, to indicate the frequency at which said circuits are energized within its frequency measurement range.

3. Frequency measuring apparatus comprising a direct current differential measuring instrument, a pair of alternating current terminals for said instrument, a pair of tuned circuits through which the differential energizing circuits of said instrument are energized from said terminals, said circuits including current rectifying means and being tuned to resonance at different frequencies slightly above and slightly below the upper and lower frequency measurement limits of said instrument, said instrument when energized through said tuned circuits producing a zero torque at a given frequency between said limits, said instrument having a stationary permanent field magnet, a moving armature and pointer and a scale with which the pointer cooperates, mechanical means for biasing said pointer to a mid-scale position when the torque of said instrument is zero, said instrument having up-scale and down-scale differential torques from such mid-scale position when energized at frequencies above and below said given frequency, said instrument having its scale calibrated with its differential torque characteristics to correctly indicate the frequency measurement at normal voltage within its frequency measurement range.

4. Frequency measuring apparatus for indicating a given frequency and slight variations above and below such frequency comprising a differential direct current measuring instrument, high impedance, negligible resistance tuned energizing circuits therefor including full wave rectifiers, one circuit being tuned so that such given frequency falls on the ascending slope of its resonance curve, and the other circuit being tuned so that such given frequency falls on the descending slope of its resonance curve and such as to produce zero differential instrument torque at such given frequency, the instrument having a scale, a moving pointer cooperating with the scale, a stationary field magnet, an armature for moving the pointer and spring means for biasing the armature so that the pointer registers at the center of the scale when the instrument torque is zero, and produces a torque responsive deflection away from the mid-scale point in a direction depending upon the direction of differential torque.

5. Frequency measuring apparatus, comprising a direct current differential measuring instrument having a differential energizing windings, alternating current terminals, connections between said terminals and one of said windings including current rectifying means, and tuning means for reducing the current through such one winding as the frequency at said terminals increases through a given range of frequency, connections between said terminals and the other of said windings including current rectifying means and tuning means for increasing the current through such other winding as the frequency at such terminal increases through such given range of frequency, the current through both of said windings being equal at a given frequency within said given range, said instrument having a scale and a cooperating pointer and mechanical means for biasing the pointer to a mid-scale position when the currents in the differential windings are equal, said instrument being calibrated to indicate frequency variation over said range at normal voltage at said terminals.

THEODORE A. RICH.